US009886741B2

(12) United States Patent
Kim et al.

(10) Patent No.: US 9,886,741 B2
(45) Date of Patent: Feb. 6, 2018

(54) METHOD AND APPARATUS FOR DISPLAYING IMAGES IN TOUCHSCREEN-BASED DEVICES

(71) Applicant: Samsung Electronics Co., Ltd., Gyeonggi-do (KR)

(72) Inventors: Kyung-Tae Kim, Gyeonggi-do (KR); Chang-Ho Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 435 days.

(21) Appl. No.: 14/283,500

(22) Filed: May 21, 2014

(65) Prior Publication Data

US 2014/0359507 A1 Dec. 4, 2014

(30) Foreign Application Priority Data

May 30, 2013 (KR) .................. 10-2013-0061534

(51) Int. Cl.
*G06F 3/0484* (2013.01)
*G06T 3/40* (2006.01)
*G06F 3/0488* (2013.01)
*G06F 3/0481* (2013.01)

(52) U.S. Cl.
CPC ............ *G06T 3/40* (2013.01); *G06F 3/04817* (2013.01); *G06F 3/04845* (2013.01); *G06F 3/04886* (2013.01); *G06F 2203/04805* (2013.01); *G06F 2203/04806* (2013.01)

(58) Field of Classification Search
None
See application file for complete search history.

(56) References Cited

U.S. PATENT DOCUMENTS

| 5,664,127 | A | * | 9/1997 | Anderson | G06F 3/0481 715/209 |
|---|---|---|---|---|---|
| 8,245,156 | B2 | * | 8/2012 | Mouilleseaux | G06F 3/0482 715/834 |
| 2006/0209016 | A1 | | 9/2006 | Fox et al. | |
| 2006/0239562 | A1 | * | 10/2006 | Bhattacharyay | G06K 9/00402 382/188 |
| 2006/0265648 | A1 | * | 11/2006 | Rainisto | G06F 3/0237 715/259 |
| 2007/0061753 | A1 | * | 3/2007 | Ng | G06F 3/0237 715/816 |
| 2008/0275642 | A1 | * | 11/2008 | Clark | G08G 5/0021 701/457 |

(Continued)

FOREIGN PATENT DOCUMENTS

KR 10-2010-0045868 A 5/2010
WO 00/75766 A1 12/2000

(Continued)

*Primary Examiner* — Phenuel Salomon
(74) *Attorney, Agent, or Firm* — Cha & Reiter, LLC.

(57) ABSTRACT

A method for displaying an image is provided, the method including: displaying, on a touchscreen of an electronic device, a plurality of items; selecting a first item from the plurality in response to an input received at the electronic device; detecting whether a condition for displaying an auxiliary area is satisfied; and responsive to the condition being satisfied, displaying the auxiliary area on the touchscreen.

15 Claims, 11 Drawing Sheets

(56) References Cited

U.S. PATENT DOCUMENTS

| | | | |
|---|---|---|---|
| 2009/0292989 A1* | 11/2009 | Matthews | G06F 3/0488 715/702 |
| 2010/0107054 A1 | 4/2010 | Park | |
| 2010/0169834 A1 | 7/2010 | Wakizaka et al. | |
| 2011/0271222 A1 | 11/2011 | Cho | |
| 2012/0192108 A1* | 7/2012 | Kolb | G06F 3/04883 715/810 |
| 2012/0206363 A1* | 8/2012 | Kyprianou | G06F 3/04886 345/168 |
| 2013/0014053 A1* | 1/2013 | Cabrera-Cordon | G06F 3/0488 715/810 |
| 2013/0176229 A1* | 7/2013 | Lee | G06F 3/041 345/169 |
| 2013/0227463 A1* | 8/2013 | Andersson Reimer | G06F 3/04842 715/779 |
| 2013/0227490 A1* | 8/2013 | Thorsander | G06F 3/04883 715/841 |
| 2014/0026097 A1* | 1/2014 | Crohas | G06F 3/04883 715/810 |
| 2014/0173482 A1* | 6/2014 | Hicks | G06F 3/0483 715/769 |
| 2016/0026345 A1* | 1/2016 | Yao | G06F 3/0488 715/815 |

FOREIGN PATENT DOCUMENTS

| | | | |
|---|---|---|---|
| WO | WO0075766 | * 12/2000 | G06F 3/033 |
| WO | 2012/136901 A1 | 10/2012 | |

* cited by examiner

METHOD AND APPARATUS FOR DISPLAYING IMAGES IN TOUCHSCREEN-BASED DEVICES

CLAIM OF PRIORITY

This application claims priority from and the benefit under 35 U.S.C. §119(a) of Korean Patent Application No. 10-2013-0061534, filed on May 30, 2013, which is hereby incorporated by reference for all purposes as if fully set forth herein.

BACKGROUND

1. Technical Field

The present disclosure relates generally to electronic devices, and more particularly, to a method and an apparatus for displaying images.

2. Description of the Prior Art

As of recent, portable terminals are being developed into multimedia devices that provide various optional services such as multimedia playback services, games and schedule management services. The increasing number of various optional services provided in portable terminals requires an appropriate user interface for conveniently managing and using the services.

In general, when a certain visual item is touched in a mobile browser, the selected item is highlighted with a focus ring to show that the visual item has been selected. However, in devices with high-resolution displays, some visual items that are displayed may be so small that when they are touched by a user, they may be completely obscured by the user's finger. In such instances, it may be preferable to increase the zoom scale of the device's screen, so that the visual items can be seen better. However, any such increase of zoom scale may require a user to manually enter a command for zoom scale magnification, which may be inconvenient. Accordingly, the need for new user interfaces that permit an effortless increase of a screen's zoom level.

SUMMARY

The present disclosure addresses this need. According to one aspect of the disclosure, a method for displaying an image is provided, the method comprising: displaying, on a touchscreen of an electronic device, a plurality of items; selecting a first item from the plurality in response to an input received at the electronic device; detecting whether a condition for displaying an auxiliary area is satisfied; and responsive to the condition being satisfied, displaying the auxiliary area on the touchscreen.

According to another aspect of the disclosure, an electronic device is provided, comprising a touchscreen and a controller configured to: display, on the touchscreen, a plurality of items; select a first item from the plurality in response to an input received via the touchscreen; detect whether a condition for displaying an auxiliary area is satisfied; and responsive to the condition being satisfied, display the auxiliary area on the touchscreen.

According to yet another aspect of the disclosure, an electronic device is provided, comprising a touchscreen and a controller configured to: display, on the touchscreen, a plurality of items; select a first item from the plurality in response to a touch object making contact with the touchscreen at a location where the first item is displayed; when the object maintains the contact with the touchscreen, performs a drag gesture, and stops at a location in the touchscreen where a second item from the plurality is displayed, detect whether the drag gesture satisfies a constraint; select the second item, when the drag gesture satisfies the constraint; and perform an action other than selecting the second item, when the drag gesture fails to satisfy the constraint.

BRIEF DESCRIPTION OF THE DRAWINGS

The above features and advantages of the present disclosure will be more apparent from the following detailed description in conjunction with the accompanying drawings, in which.

DETAILED DESCRIPTION

As used throughout the disclosure, the term "touch object" refers to any object that used to provide touch input to a touch screen of an electronic device, such as, but not limited to, a finger, a stylus, or a pen. Hereinafter, aspects of the disclosure will be described in detail with reference to accompanying drawings. A detailed description of well-known functions and configurations will be omitted so as not to obscure subject matter that is considered more pertinent.

Figure 1A:
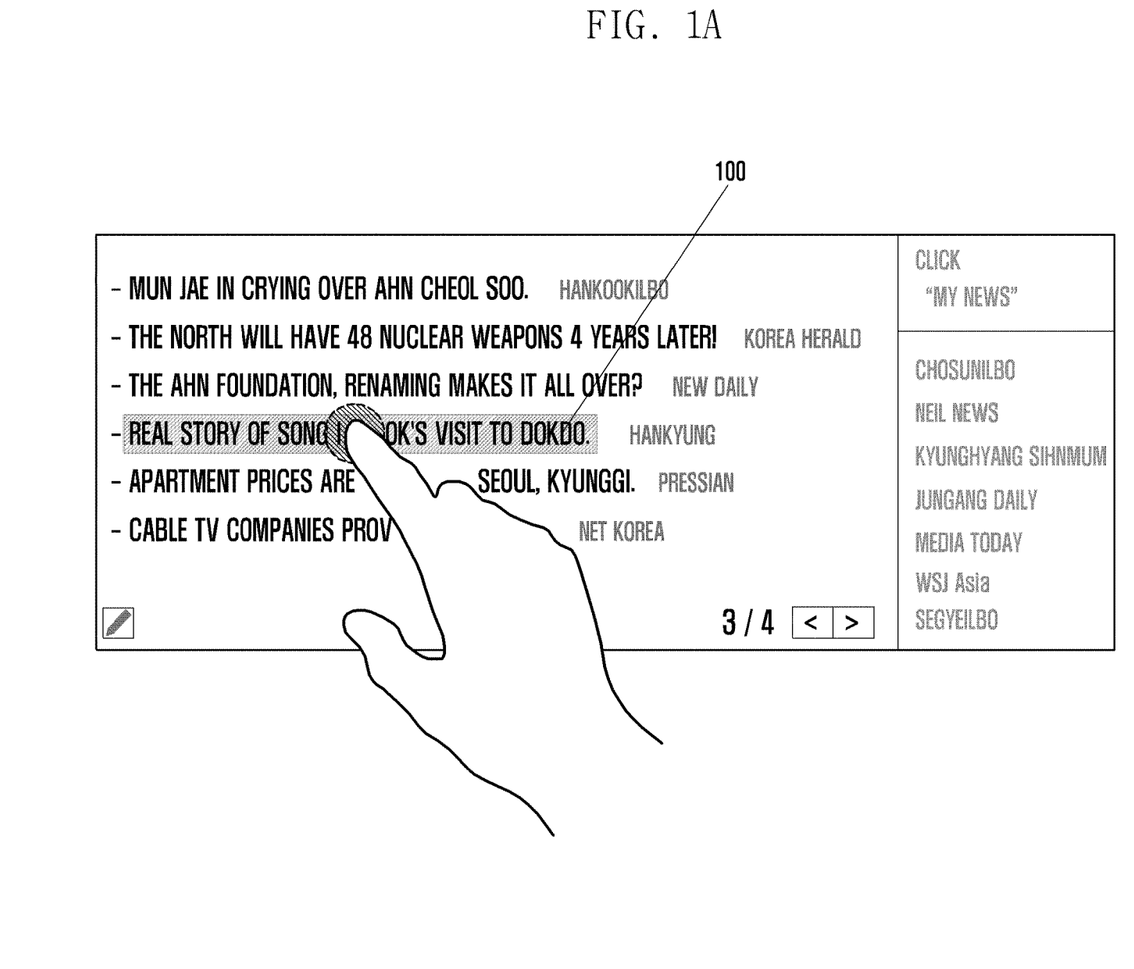
FIG. 1A and FIG. 1B are diagrams of an example of a user interface of an electronic device, according to aspects of the disclosure.
Figure 1B:
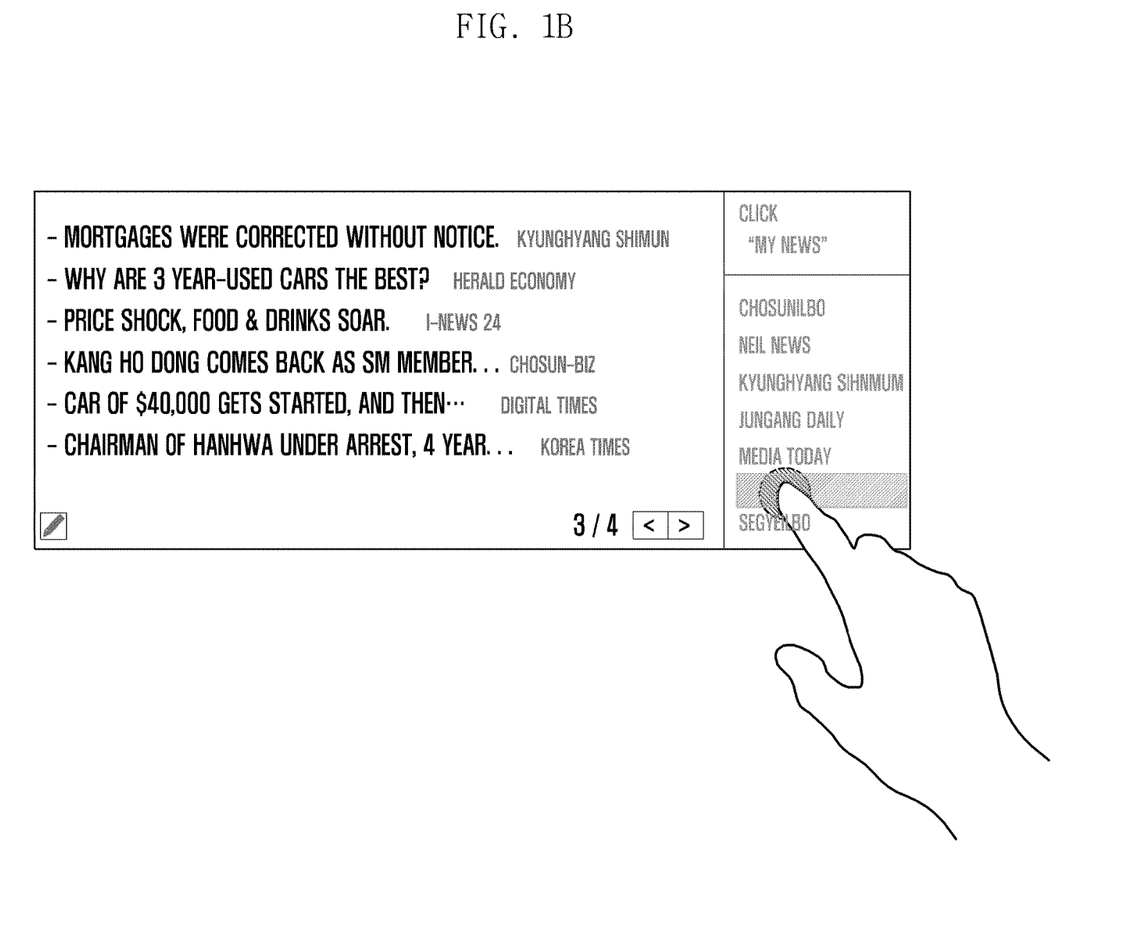

FIGS. 1A and 1B are diagrams of an example of a user interface of an electronic device, according to aspects of the disclosure. FIG. 1A shows the device in a state in which sizes of items (news headlines in the form of text) in a web page are not smaller than a size of a touch object (a user's finger), so that the user is able to easily recognize the selected item. As shown in FIG. 1A, an item selected by the user is indicated by a focus ring which surrounds the selected item, or by a highlighted background.

FIG. 1B shows the device a state in which sizes of items (news headlines in the form of text) to be selected by the user are similar to the size of the touch object (the user's finger), which may hinder the user from recognizing the selected item. As shown in FIG. 1B, when the size of the item displayed in the web page is similar to or smaller than the size of an area that the touch object contacts within the touch screen for a touch input, the selected area is obscured by the touch object. In such instances, the user may not be able to recognize the item that is being selected when the use's finger moves in close proximity to the item. This in turn may lead to the user making an input error and accidentally selecting an item which the user did not intend to select.

To prevent such errors, in some aspects, an auxiliary area may be defined that provides a method of displaying item-related information corresponding to an item that is being selected. The item related information may include at least one of text, a still image, a movie, a website address and a sub-menu which correspond to the selected item. According to another aspect of the present disclosure, an item selected by a user may be displayed in the auxiliary area.

Figure 2:
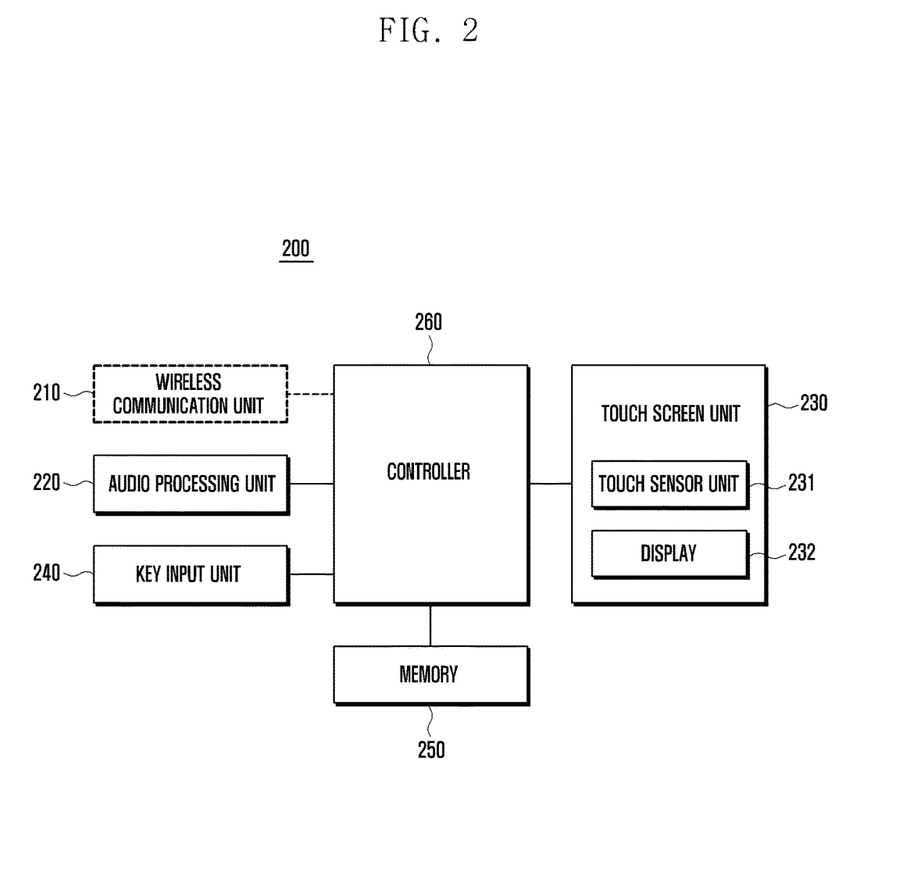
FIG. 2 is a block diagram of an example of a device, according to aspects of the disclosure.

FIG. 2 is a block diagram of an example of a device 200 according to aspects of the disclosure. The device 200 may be any suitable type of device, such as a smart phone, a desktop computer, a laptop computer, a tablet, an electric appliance, a camera, etc. As shown, in this example, the device 200 may include a wireless communication unit 210, an audio processing unit 220, a touch screen unit 230, a key input unit 240, a memory 250 and a controller 260.

The wireless communication unit 210 carries out transmission and reception of data for wireless communication of the device 200. The wireless communication unit 210 may include a radio frequency (RF) transmitter for modulating and amplifying a frequency of a signal to be transmitted, and an RF receiver for low-noise-amplifying a received signal and demodulating a frequency thereof.

In addition, the wireless communication unit 210 may receive data through a wireless channel to thereby output the data to the controller 260, and may transmit data output from the controller 260 through the wireless channel. The device 200 according to aspects of the disclosure does not need to have the wireless communication unit 210, and that is why the wireless communication unit 210 is illustrated by dotted lines in the drawing. For example, if the device 200 is an MP3 player or an electronic dictionary, it does not need to adopt the wireless communication unit 210.

The audio processing unit 220 may be configured with a CODEC which may include a data CODEC for processing packet data and an audio CODEC for processing an audio signal like a voice. The audio processing unit 220 converts a digital audio signal into an analog audio signal by the audio CODEC to thereby reproduce the analog audio signal by a speaker (SPK), and also converts an analog audio signal input from a microphone (MIC) into a digital audio signal by the audio CODEC.

The touch screen unit 230 includes a touch sensor unit 231 and a display 232. The touch sensor unit 231 detects a touch input from a user. The touch sensor unit 231 may be implemented by a touch sensor of a capacitive overlay, a resistive overlay and an infrared beam, or by a pressure sensor. It is to be understood, the touch sensor unit 231 may be implemented using any suitable sensor devices, which are able to detect a contact or a pressure of an object, may be used. In operation, the touch sensor unit 231 detects a touch input from a user and generates a detection signal to be transmitted to the controller 260. The detection signal includes coordinate data of a user's touch input. When a user inputs a touch location movement gesture, the touch sensor unit 231 generates a detection signal including coordinate data for the location movement path of the touch to be thereby transmitted to the controller 260.

The display 232 may be implemented by Liquid Crystal Displays (LCDs), Organic Light Emitting Diodes (OLEDs), and Active Matrix Light Emitting Diodes (AMOLEDs). The display 232 provides a user with various visual information such as a menu, input data and setup information of a function of the device 200. The display 232 may output a booting image, a background image, a menu image, a phone call image, application images, or the like.

The key input unit 240 receives an input of a user's key manipulation for controlling the device 200, and generates an input signal to be thereby transmitted to the controller 260. The key input unit 240 may be configured with a key pad including number keys and direction keys, and with predetermined function keys at one side of the device 200. According to aspects of the disclosure, if the touch screen unit 230 provides all of key input functions, the key input unit 240 may be omitted in the device 200.

The memory 250 stores programs and data necessary for operating the device 200, and includes a program area and a data area. The program area may store programs for controlling the general operation of the device 200, an Operating System (OS) for booting the device 200, application programs for reproducing multimedia contents, and other application programs necessary for optional functions of device 200 such as, for example, a camera, sound reproduction, and image or movie reproduction. The data area may store data, such as images, movies, a phone book and audio data, which result from the use of the device 200.

The controller may include processing circuitry, such as a processor (e.g., an ARM-based processor, an x86-based processor, etc.), an Application Specific Integrated Circuit (ASIC), a Field-Programmable Gate Array (FPGA), and/or any other suitable type of processing circuitry. The controller 260 controls general operations of elements of the device. Particularly, although a certain item is selected to be covered with the touch object, the controller 260 may control the process of displaying a selected item separately.

In particular, according to aspects of the disclosure, when a touch input is detected for selecting a predetermined item from a plurality of displayed items, the controller 260 may determine whether an auxiliary area of the selected item needs to be displayed, and, if necessary, the controller 260 may control to display item related information corresponding to the selected item in the auxiliary area. The item related information may include at least one of, for example, text, a still image, a movie, a website address and a sub-menu, which correspond to the selected item. Additionally or alternatively, the controller 260 may control to display an item selected by a user in the auxiliary area.

In some aspects, the controller 260 may determine whether to display the auxiliary area, based on at least one of a reference area defined with a width and a height, resolution information of the touch screen, and zoom scale information of an image displayed on the touch screen, which will be described further below.

In some aspects, the controller 260 may control to display the selected item and another item (or item related information thereof) adjacent to the selected item within a predetermined distance in at least one of the auxiliary areas.

In some aspects, the controller 260 may determine whether a change input for changing the selected item is detected after detection of the touch input. Also, when the change input is detected, the controller 260 may determine whether the change input leaves a predetermined area. If the change input leaves the predetermined area, the controller 260 may processes the change input as an input for an image conversion. On the contrary, if the change input does not leave the predetermined area, the controller 260 may control to display item related information corresponding to an item reselected by the change input in the auxiliary area.

In some aspects, the controller 260 may determine whether a change input for changing the selected item is detected after detection of the touch input. Also, when the change input is detected, the controller 260 may determine whether the change input passes by a predetermined number of items. If the change input passes by the predetermined number of items, the controller 260 may process the change input as an input for an image conversion. On the contrary, if the change input does not pass by the predetermined number of items, the controller 260 may control to display item related information corresponding to an item reselected by the change input in the auxiliary area.

According to another aspect of the disclosure, the controller 260 may control to decide a location of the auxiliary area based on at least one of a size of the selected item, a location of the selected item, and a location where the touch input is generated, and to thereby display the auxiliary area.

Figure 3:
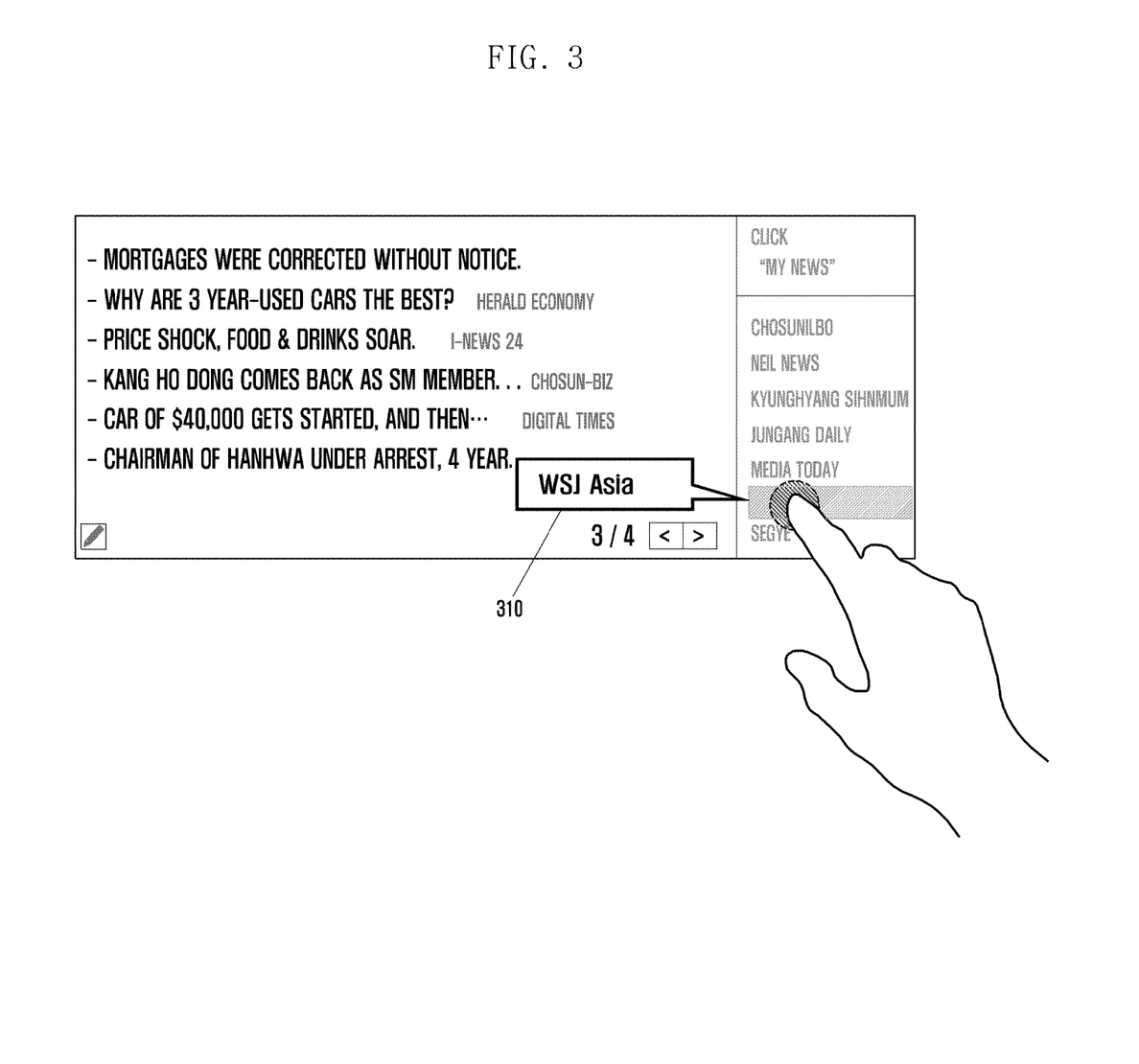
FIG. 3 is a diagram illustrating a technique for displaying an auxiliary area according to aspects of the disclosure.

FIG. 3 is a diagram illustrating a technique for displaying an auxiliary area according to aspects of the disclosure. When a touch input to a certain item in the web page is detected, the device 200 determines whether the selected item is covered with a touch object. If the selected item is determined to be covered with the touch object, the device 200 displays an auxiliary area 310 and allows item related information corresponding to the selected item to be displayed in the auxiliary area 310. The auxiliary area 310 may include the selected item and an image of a focus ring surrounding the item.

According to aspects of the disclosure, the device 200 may determine whether the auxiliary area 310 needs to be displayed based on at least one of dots per inch (dpi) of a predetermined area, zoom scale information of a the browser that displays the item, size of the touch object, and or any other suitable information. A process of determination on whether the auxiliary area 310 needs to be displayed will be now described in detail with reference to FIG. 4.

Figure 4:
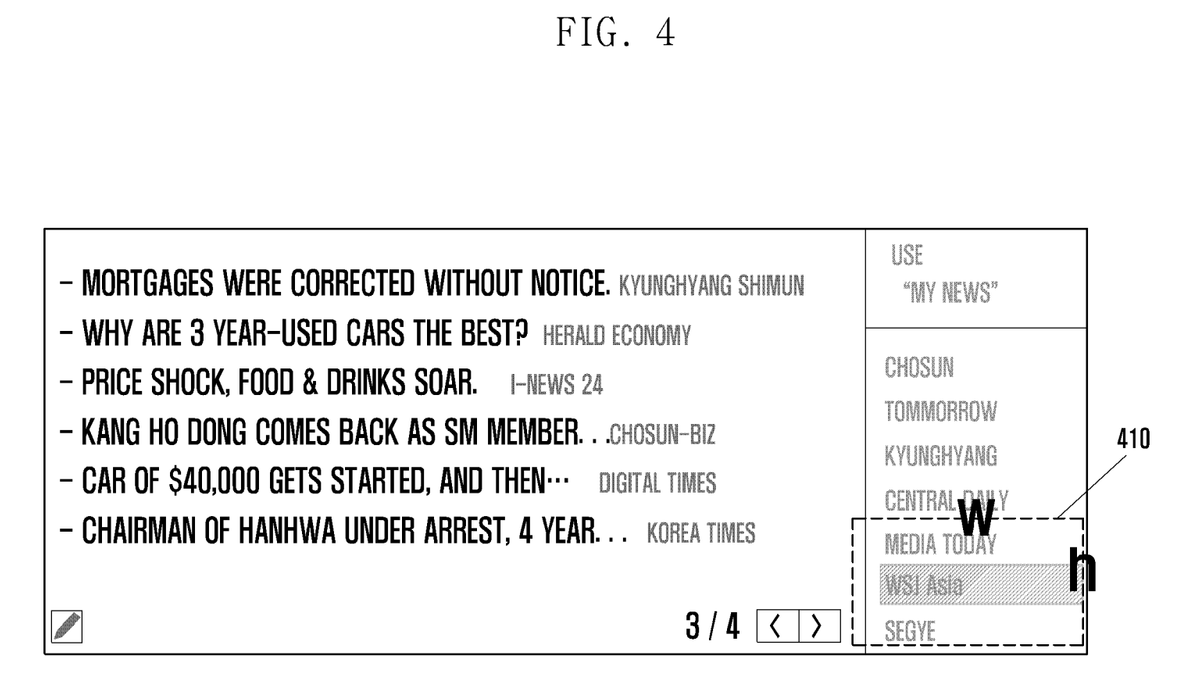
FIG. 4 is a diagram illustrating an example of a technique for determining whether to display an auxiliary area, according to aspects of the disclosure.

FIG. 4 is a diagram illustrating an example of a technique for determining whether to display the auxiliary area 310, according to aspects of the disclosure. As illustrated, a reference area 410 having a width W and a height H and used in determining whether the auxiliary area 310 needs to be displayed. More specifically, in some aspects, the reference area 410 may be equal in size to an area on the touchscreen that the touch object contacts when the touch object is pressed against the touchscreen.

Also, the reference area 410 may be defined to a size that is likely to be covered with the touch object. The reference area 410 may be defined based on an area that the touch object contacts within the touch screen during the touch input on the touch screen.

The reference area 410 may be set by a user using a separate setup procedure, or may be set in a default value without a user's setup. In some aspects, the size of the reference area 410 may be set based on a type of touch object used to select a particular item (e.g., a finger, a stylus, etc.). In some aspects, the size of the reference area 410 may be set based on the age of a user who is using the device 200. In some aspects, the age of the user may be identified by the device 200 by using facial recognition.

In some aspects, the device 200 may store a definition (e.g., an object and/or any other suitable representation) of the reference area 410 in memory and determine whether the auxiliary area 310 needs to be displayed based on this definition. More specifically, in determining the necessity of the display of the auxiliary area, for example, the device 200 may set a limit value based on the reference area 410, and may compare a size of an item selected by a user's touch input with the limit value to determine whether the auxiliary area 310 needs to be displayed. In this case, if the size of the selected item is larger than the limit value, the device 200 may determine that the auxiliary area 310 does not need to be displayed. Conversely, if the size of the selected item is smaller than the limit value, the device 200 may determine that the auxiliary area 310 needs to be displayed.

In some aspects, if at least one of the width or the height of the selected item is equal to or greater than the width or the height, respectively, of the reference area 410, the device 200 may determine that the auxiliary area 310 does not need to be displayed. By contrast, if at least one of the width or the height of the selected item is smaller than the width or the height, respectively, of the reference area 410 the device 200 may determine that the auxiliary area 310 needs to be displayed.

Figure 5:
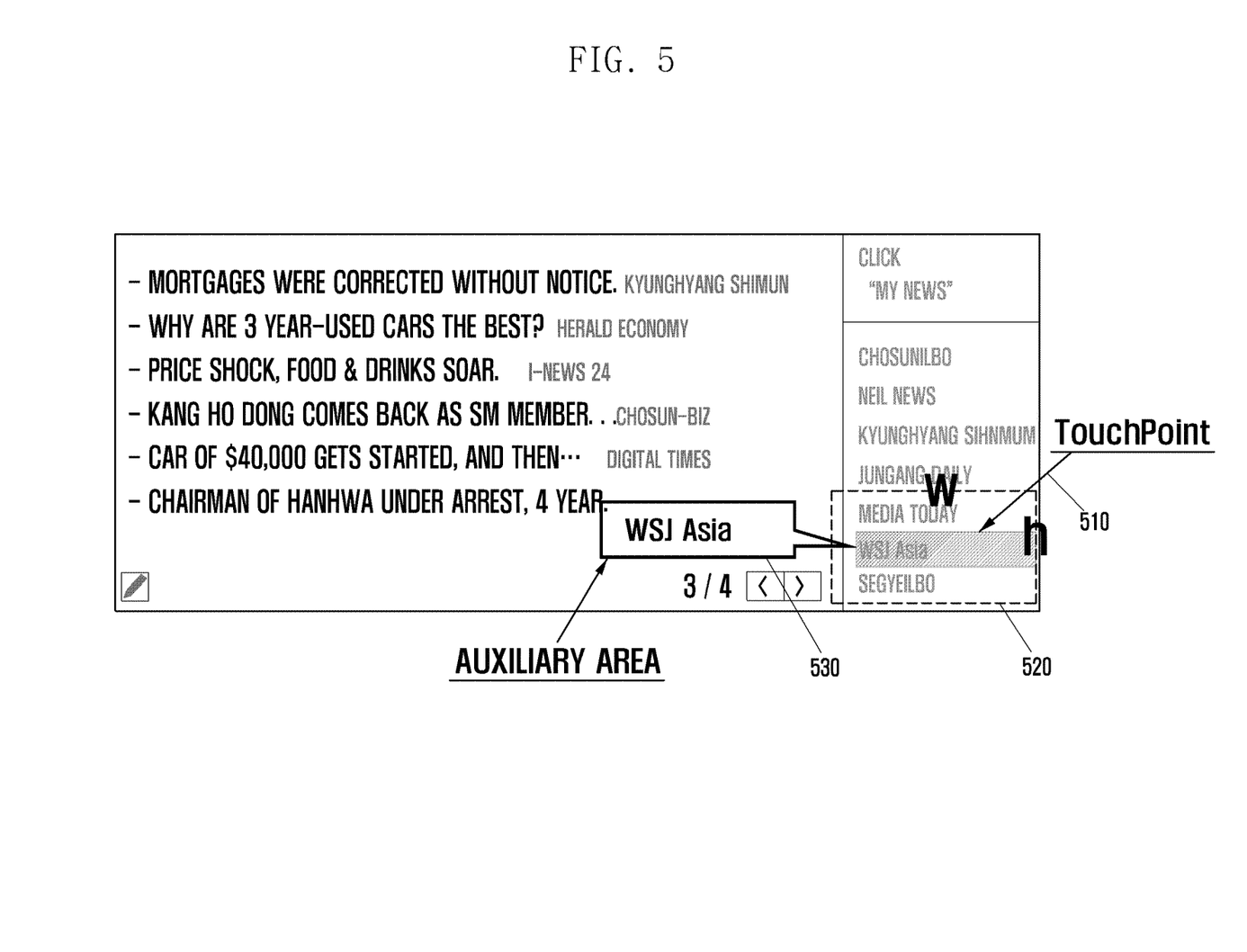
FIG. 5 is a diagram depicting an example of an auxiliary area according to aspects of the disclosure.

FIG. 5 is a diagram depicting an example of an auxiliary area according to aspects of the disclosure. According to aspects of the disclosure, a display location of an auxiliary area 530 may be determined based on at least one of a size of a selected item, a location of the selected item, a size of a reference area 520, and a touch point 510. For example, as shown in FIG. 5, the auxiliary area 530 may be displayed on the left side of the selected item. However, it is to be understood that the auxiliary area may be displayed at any other location on the screen of the device 200. For example, the auxiliary area 530 may be displayed on the left side of the selected item for a right-handed user, or on the right side of the selected item for a left-handed user, respectively. In some aspects, the auxiliary area 530 may be displayed on either side of the selected item according to a user's setup.

Figure 6:
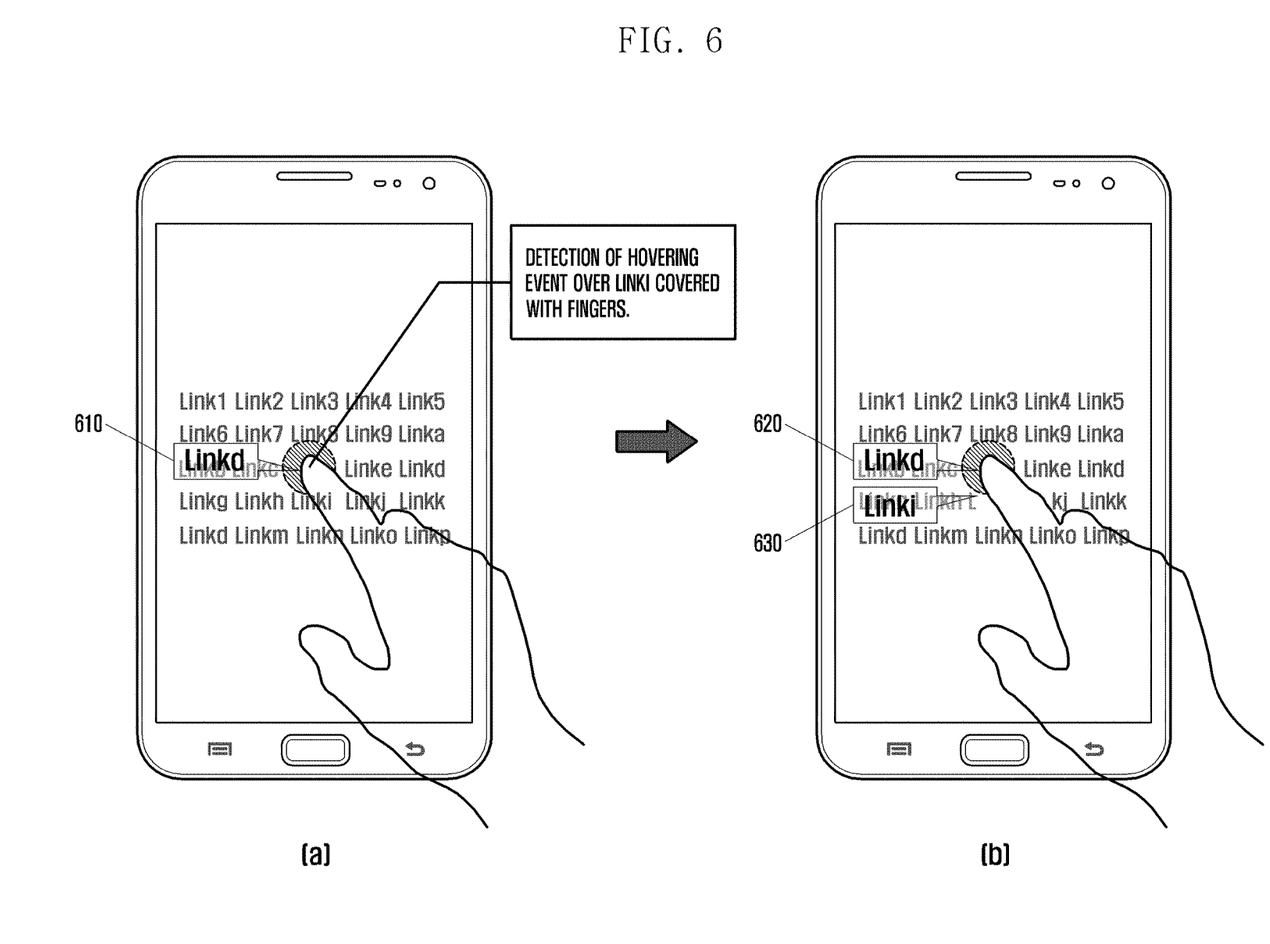
FIG. 6 is a diagram illustrating an example of a technique for displaying an auxiliary area according to aspects of the disclosure.

The copy of the selected item displayed in the auxiliary area may have the same size as the original item that is being selected. Alternatively, the copy of the selected item displayed in the auxiliary area may be larger in size than the original item that is being selected. In such instances, the size to which the copy of the selected item is enlarged may depend on at least one of zoom scale information and font size information of a current browser FIG. 6 is a diagram illustrating an example of a technique for displaying an auxiliary area according to aspects of the disclosure. FIG. 6 illustrates an example of a technique for displaying an item (or item related information) that is likely to be covered with a touch object when the item is selected, according to aspects of the disclosure. Specifically, screen (a) of FIG. 6 shows that when the item "Linkd" is selected, that item is covered by the touch object used to make the selection (e.g., a user's finger), so that the selected item is displayed in an auxiliary area 610.

Furthermore, in this example, an item "Linki" is also partially covered with the touch object as shown in screen (a) of FIG. 6. In that regard, in some aspects, when the input is received the device 200 may determine that item "Linki" is likely to be covered by the touch object, even though the item "Linki" is not being selected. The determination may be based on at least one of a size of the item "Linki", a location of the item "Linki", a size of the reference area associated with the item "Linkd", a touch point, dpi of the item "Linki", and current zoom scale information of a browser or other software that is displaying the items "Linki" and "Linkd."

In some aspects, the device 200 may display the item "Linkd" selected by the user in the first auxiliary area 620, and may display the item "Linki" that is not selected by the user but is covered with the touch object in the second auxiliary area 630, respectively, as shown in screen (b) of FIG. 6. Doing so may enable the user to recognize what item is adjacent to the selected item.

Additionally or alternatively, in some aspects, the selected item and the adjacent item may be displayed together in a single auxiliary area. Furthermore, in such instances, a visual indication may be output differentiating the item selected by the user (e.g., "Linkd") from the item that is adjacent to the selected item (e.g., "Linki"). For example, the item selected by the user may be highlighted.

Figure 7:
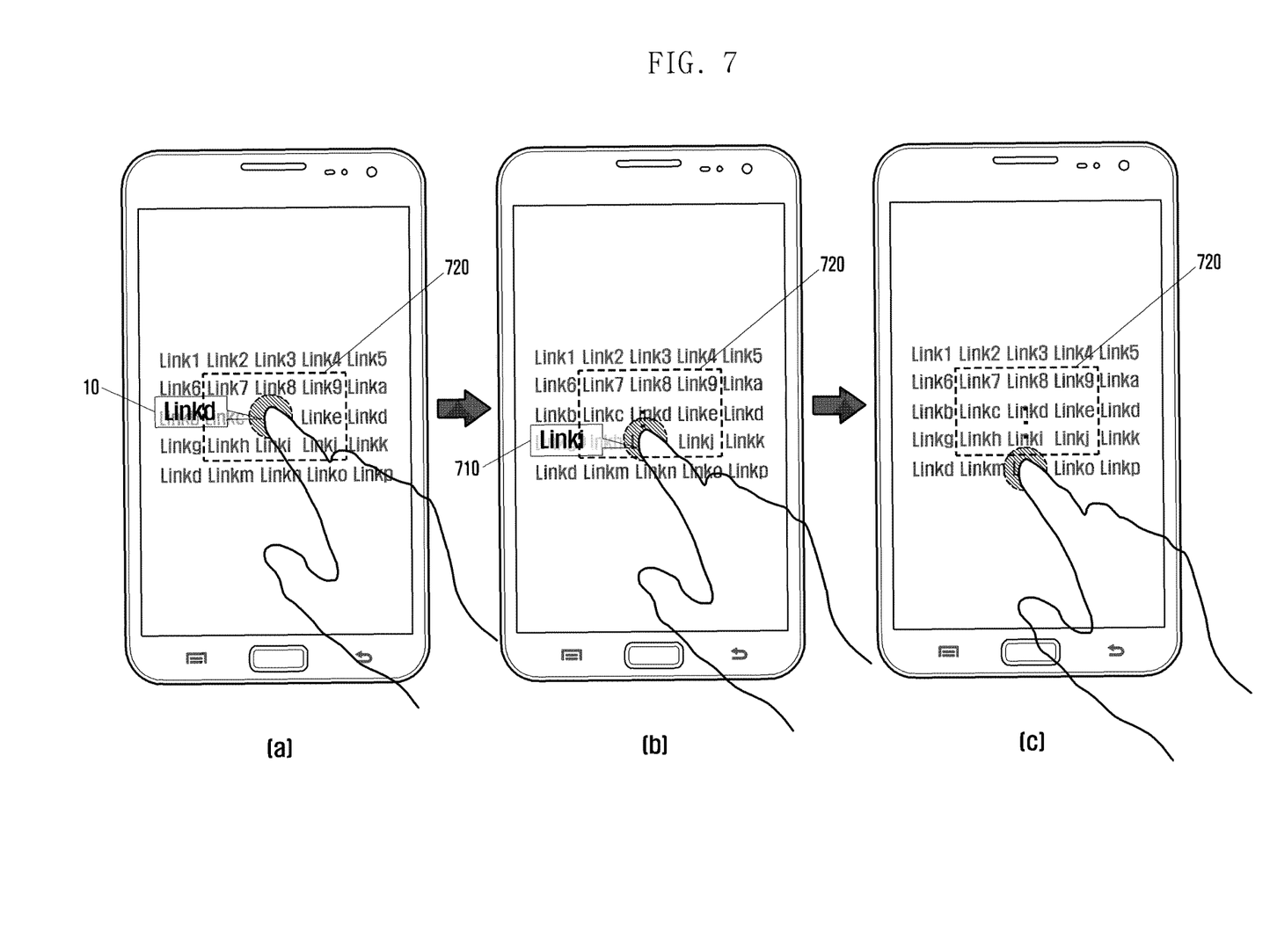
FIG. 7 is a diagram illustrating an example of a technique for displaying an auxiliary area according to aspects of the disclosure.

FIG. 7 is a diagram illustrating an example of a technique for displaying an auxiliary area according to aspects of the disclosure. Specifically, FIG. 7(a) shows a state of the device 200 in which an item "Linkd" selected by a user is covered with a touch object, so that the selected item is displayed in an auxiliary area 710. Also, after a touch input for selection is detected, the device 200 determines whether the touch input is removed. When the touch input is removed, the device 200 may perform a function related to the selected item.

In this example, the item "Linki" is selected. However, this selection is made in error. Upon realizing the error, the user may attempt to correct it by maintaining a touch of the screen while sliding the user's finger onto the item that the user actually intended to select (e.g., "Linkd"). However, the sliding of the user's finger from item "Linki" onto item "Linkd" may be mistaken by the device 200 for a panning gesture for the turning of pages, or an instruction for performing another operation that is different from the selection of items. Accordingly, the device 200 may erroneously change (or scroll) the page displayed on the screen instead of selecting the item "Linki."

In some aspects, the device 200 may avoid making such an error by utilizing a change reference area 720. In particular, the device 200 may store a definition (e.g., an object and/or any other suitable representation) of the change reference area 720 in memory and determine whether input provided subsequently to the selection of an item is intended to correct an error in the selection of the item or perform another function that is different from correcting the error. For example, the size of the change reference area 720 may be based on a size of the selected item (e.g., item "Linki"). As another example, the change reference area 720 may be shaped as a rectangle, a square, a circle, an oval, and/or any other suitable geometric figure. When input is received in the reference area, after the selection of a first item (e.g., item "linkd), the device 200 may treat this input as being provided for the purpose of correcting an error in the selection of the first item. However, if the input is received outside of the selection area, or the input leaves the selection area, that input may be treated as input for performing a pre-designated function (e.g., flipping a page).

Referring to FIG. 7(b), based on the change reference area 720, when a change input (e.g., a drag input, referred to as a drag input hereinafter), that is continuously detected after selection of an item, does not leave the change reference area 720, the device 200 may display item related information corresponding to an item that is reselected according to the drag input in the auxiliary area 710. That is, when the selected item is changed into "Linki" by a user's drag input, and simultaneously when the drag input does not leave the change reference area 720, the device 200 may change the item related information displayed in the auxiliary area 710 to thereby be displayed according to the drag input.

By contrast, referring to FIG. 7(c), based on the change reference area 720, when a drag input, that is continuously detected after selection of an item, leaves the change reference area 720, the device 200 processes the drag input as a panning gesture or a scroll input. Accordingly, the currently displayed image may be converted or moved according to a direction of the drag input.

Figure 8:
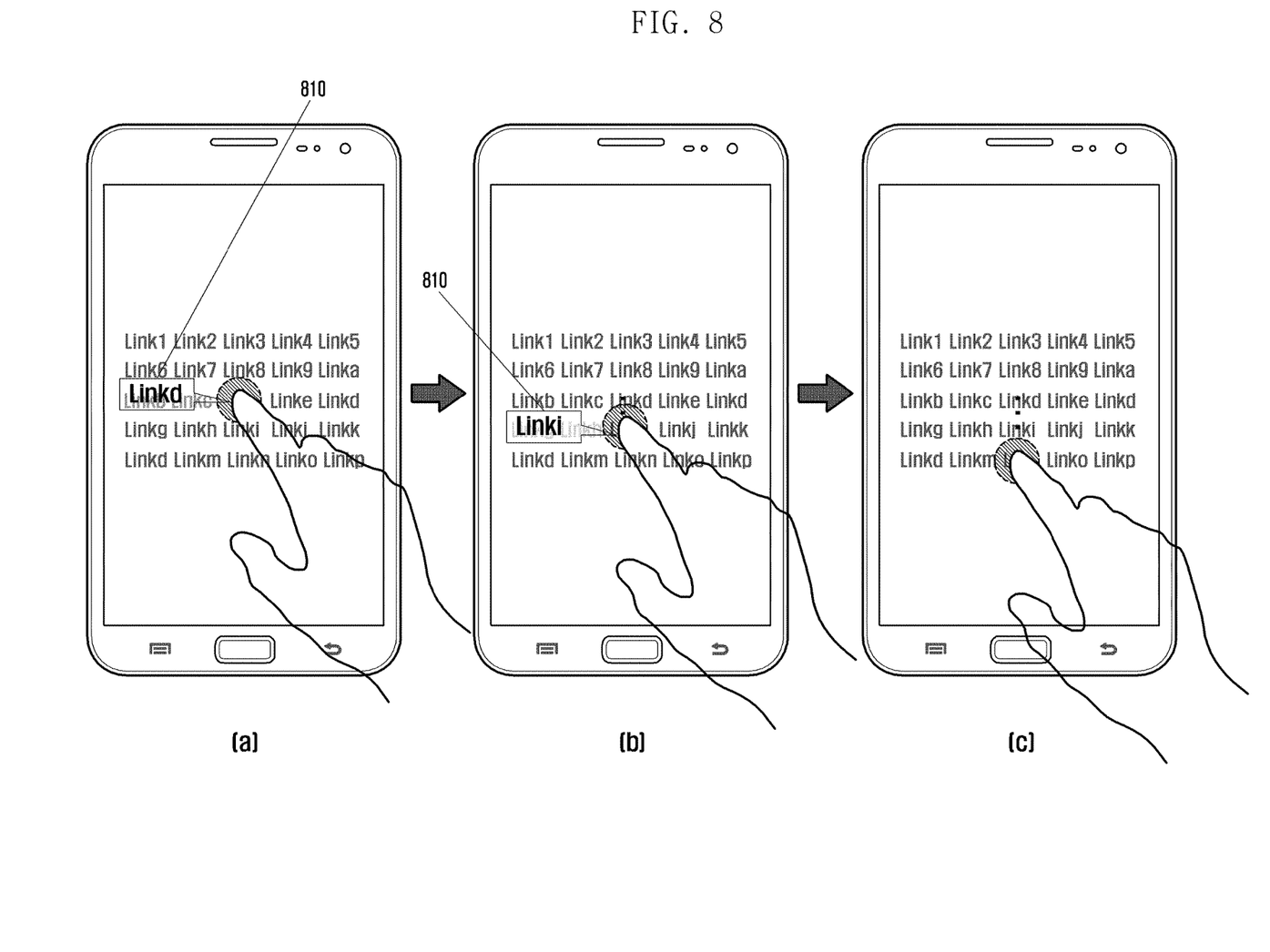
FIG. 8 is a diagram illustrating an example of a technique for displaying an auxiliary area, according to aspects of the disclosure.

FIG. 8 is a diagram illustrating an example of a technique for displaying an auxiliary area, according to aspects of the disclosure. In this example, it is assumed that a plurality of items are in a lattice or any other suitable arrangement. Furthermore, in this example, the item "Linki" is selected. However, this selection is made in error. Upon realizing the error, the user may attempt to correct it by maintaining a touch of the screen while sliding the user's finger onto the item that the user actually intended to select (e.g., "Linkd"). However, the sliding of the user's finger from item "Linki" onto item "Linkd" may be mistaken by the device 200 for a panning gesture for the turning of pages or a command for performing an operation that is different from the selection of items. Accordingly, the device 200 may erroneously change (or scroll) the page displayed on the screen instead of selecting the item "Linki."

In some aspects, the device 200 may avoid making such an error by counting the number of items that are traversed by user input that is continuously received after the item "Linkd" is selected. Specifically, FIG. 8(b) illustrates an example in which a drag input does not pass by the predetermined number of items. That is, when the drag input, that is continuously detected after selection of the item, does not pass by the predetermined number of items, the device 200 may change item related information displayed in the auxiliary area 810 to be thereby displayed in the auxiliary area 810 according to the drag input. That is, with a user's drag input, if the selected item is changed into the item "Linki", and simultaneously if the drag input does not pass by the predetermined number of items, the device 200 may change the item related information displayed in the auxiliary area 810 to be thereby displayed according to the drag input.

By contrast, FIG. 8(c) illustrates one example in which a drag input passes by the predetermined number of items. That is, when the drag input, that is continuously detected after selection of an item, passes by the predetermined number of items, the device 200 processes the drag input as a panning gesture or a scroll input. Accordingly, the current displayed image may be converted or moved according to a direction of the drag input.

Figure 9:
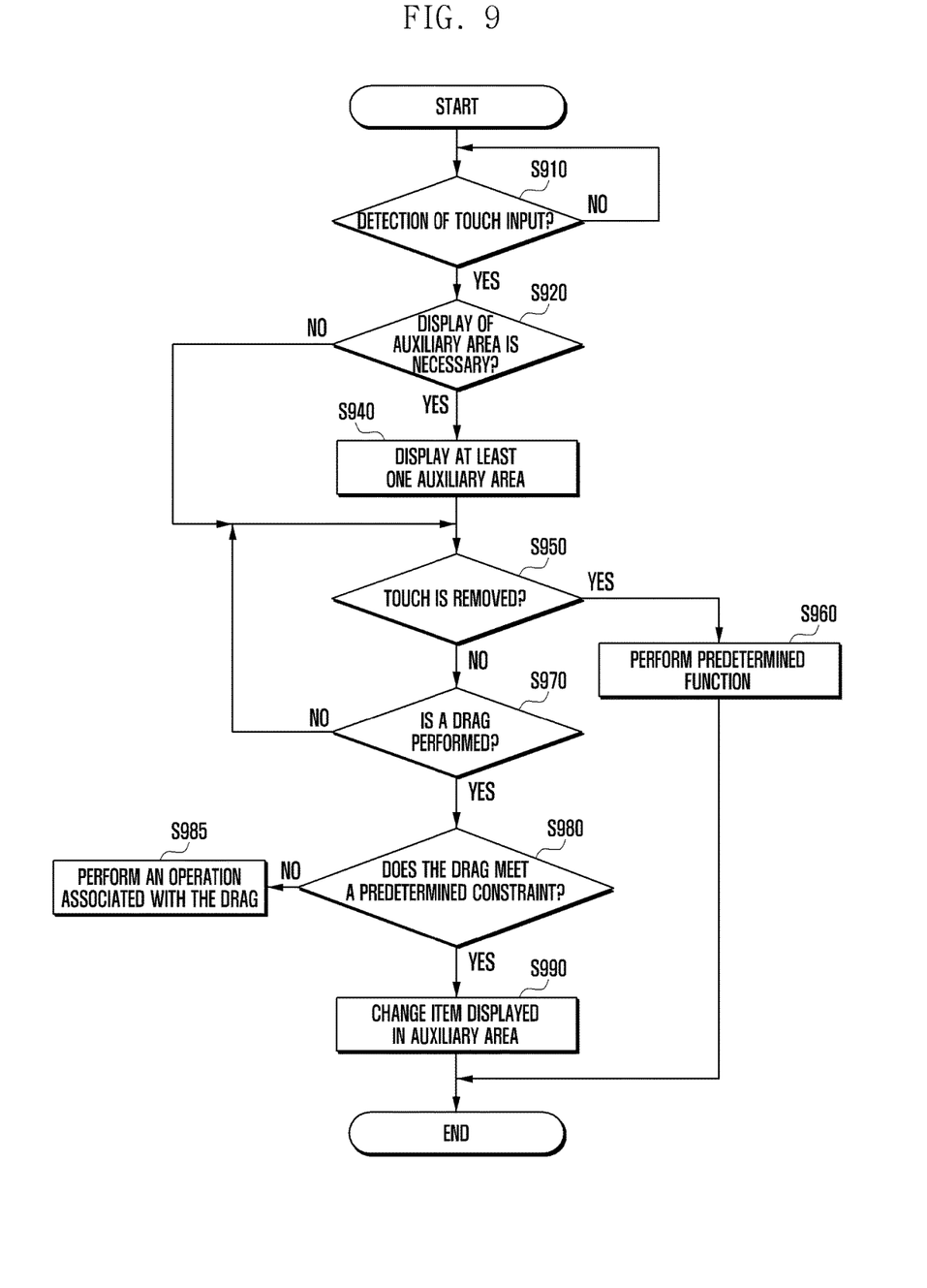
FIG. 9 is a flowchart of an example of a process for displaying an auxiliary area, according to aspects of the disclosure.

FIG. 9 is a flowchart of an example of a process for displaying an auxiliary area, according to aspects of the disclosure. In this example, an image including at least one item is displayed in a touch screen or a display of the device 200. The image may include a browser image, a background image, a home image, and/or any other suitable type of image.

In step S910, the device 200 determines whether a touch input is detected. The touch input may be performed by a touch object including a user's finger and a touch pen.

In step S920, the device 200 determines whether an auxiliary area needs to be displayed. As discussed above, the device 200 may define a reference area defined with a width and a height, and may determine whether the auxiliary area needs to be displayed based on the reference area, dpi and zoom scale information of a current image, as set forth before. When the auxiliary area is determined not to be necessary, the process proceeds to step S950. Otherwise, the process proceeds to step S940.

In step S940, at least one auxiliary area is displayed. In this case, the device 200 may display item related information corresponding to an item selected by the touch input in the auxiliary area. The item related information may include at least one of text, a still image, a movie, a website address, a sub-menu corresponding to the selected item, and/or any other suitable type of information.

In step S950, the device 200 may determine whether the touch input is removed. When the touch input is removed, the process proceeds to step S960. Otherwise, the process proceeds to step S970.

In step S960, the device 200 performs a function corresponding to the item selected by the touch input. For example, the selected item may be performed, or a sub-menu which belongs to the selected item may be displayed.

In step S970, the device 200 determines whether a drag is performed after the item is selected. For example, while the user is performing a drag input, the device 200 might detect a difference between a location where a first touch input is generated and a location where a current touch input is generated. If a drag is being performed, the process proceeds to step S980. Otherwise, the process returns to step S950.

In step S980, the device 200 determines whether the drag meets a constraint. For example, the drag may meet the constraint if the drag is performed within a predetermined area surrounding the location where the touch input is first performed. By contrast, in this example, the drag may fail to meet the constraint if the drag exits the predetermined area. As another example, the drag may meet the constraint if the drag spans over no more than a predetermined number of items that are displayed by the device 200. By contrast, in this example, the drag may fail to meet the constraint if the drag spans more than the predetermined number of items. As yet another example, the drag may meet the constraining if the drag extends no further than a predetermined distance from the selected item. If the constraint is satisfied, the process proceeds to step S990. Otherwise, the process proceeds to step S985.

In step S985, the device 200 performs a function corresponding to the drag (e.g., scrolling, changing of page/screen, etc.).

In step S990, the device 200 may select another item based on the drag gesture and display information related to the other item in the auxiliary area. In doing so, the device 200 may display item related information of an item corresponding to a location where the current touch input is generated in the auxiliary area.

Figure 10:
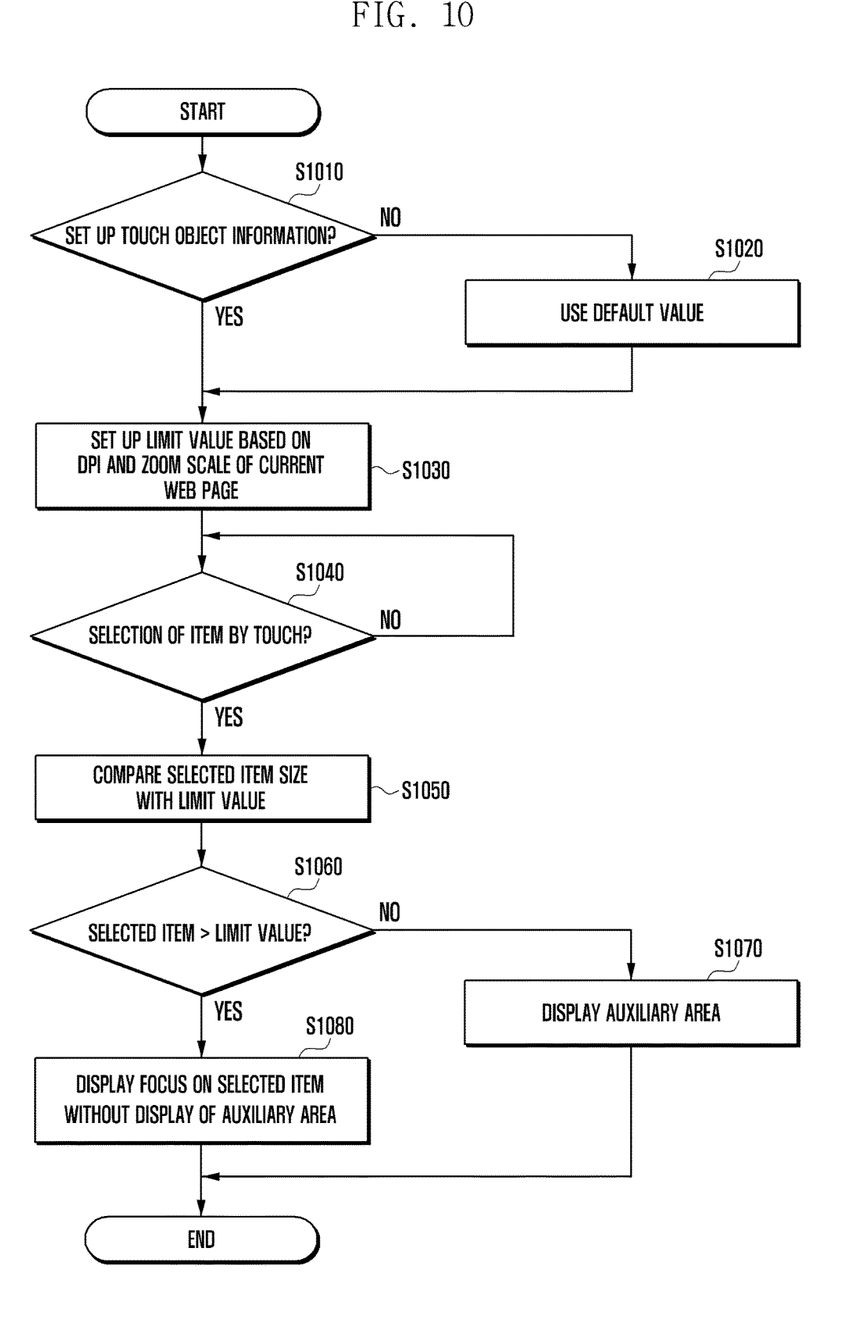
FIG. 10 is a flowchart of an example of a process, according to aspects of the disclosure.

FIG. 10 is a flowchart of an example of a process, according to aspects of the disclosure. In step S1010, the device 200 determines whether information is available that associated with a particular touch object that is associated with the device 200. The information for the touch object may include identification of a type of touch object that is to be used (e.g., fingers or pens), a size of the touch object, an area that the touch object contacts within the touch screen through a touch input, or the like.

When the information is set up, the process proceeds to step S1020. Otherwise, the process proceeds to step S1020.

In step S1020, the device identifies default touch object information.

In step S1030, the device 200 sets up a limit value based on dpi and a zoom scale of a current image (e.g., a web page).

In step S1040, the device 200 determines whether an item is selected by a touch input. When an item is selected, the device 200 proceeds to step S1050. Otherwise, step S1040 is repeated.

In step S1050, the device 200 compares a size of the selected item with the preset limit value.

In step S1060, the device 200 determines whether the size of the selected item is greater than the limit value. If the size of the selected item is greater than the limit value, it is likely that the item is too big to be fully covered with the touch object. Accordingly, in this case, the process proceeds to step S1080 and the device 200 displays a focus on the selected item.

By contrast, if the size of the selected item is smaller than the limit value, the item is likely to be covered with the touch object, so that a user is not able to easily recognize the selected item. In this case, the process proceeds to step S1070 and the device 200 displays an auxiliary area and display item related information corresponding to the selected item in the auxiliary area.

According to aspects of the disclosure, when an item is selected, a user is able to recognize item related information corresponding to the selected item in the separate auxiliary area, which may enhance a user's convenience. Also, according to aspects of the disclosure, when a user selects an incorrect item, the selection may be easily changed to a desired item, so that a mis-operation due to an incorrect touch may be prevented.

It is to be understood, that the term "item" may refer to a visual object, a plurality of visual objects, or a portion of a visual object that is displayed on the screen of a device. The visual object(s) may include text, images, and/or any other type of information that is capable of being visually presented on the display screen of a device. Furthermore, it is to be understood that the Figures are provided as an example only. At least some of the operations disclosed by the Figures can be performed in a different order, performed concurrently, or altogether omitted.

Furthermore, although the above examples, are provided in the context of touchscreen-based devices, it is to be understood that the techniques and concepts described herein can be utilized with any suitable input device, such as, but not limited to, a camera, a mouse, etc. As used throughout the disclosure, the term "make contact" may refer to the making of a physical contact between a touch object and a touch screen, making electrical contact between the physical object and the touch screen, and or making any other suitable type of contact.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Unless otherwise stated, the examples presented herein are not mutually exclusive, but may be implemented in various combinations to achieve unique advantages. As these and other variations and combinations of the features discussed above can be utilized without departing from the disclosed subject matter as defined by the claims, the foregoing description of the embodiments should be taken by way of illustration rather than by way of limitation of the invention as defined by the claims. It will also be understood that the provision of examples (or aspects) of the invention (as well as clauses phrased as "such as," "including," "may," "for example," and the like) should not be interpreted as limiting the invention to the specific examples; rather, the examples are intended to illustrate only one of many possible embodiments.

It should be understood by those skilled in the art that many variations and modifications of the method and apparatus described herein will still fall within the spirit and scope of the present disclosure as defined in the appended claims and their equivalents.

What is claimed is:

1. A method for displaying an image, the method comprising:
    displaying, on a touchscreen of an electronic device, a plurality of items;
    selecting a first item from the plurality of items in response to a first input received at the electronic device;
    determining whether a width or height of an area corresponding to the first input is less than a threshold width or height;
    displaying an auxiliary area on the touchscreen including an enlarged display of at least a portion of the first item, if the width or height of the area corresponding to the first input is less than the threshold width or height;
    if a second item is selected from the plurality of items in response to a second input received at the electronic device, identifying whether the second item is disposed within a predetermined area of the touchscreen centered on a location of the first input;
    if the second item is disposed within the predetermined area, changing the displayed auxiliary area by removing the enlarged display of the at least the portion of the first item to display an enlarged display of the second item; and
    if the second item is not disposed within the predetermined area, terminating display of the auxiliary area that is displaying the enlarged display of the at least the portion of the first item,
    wherein the auxiliary area includes information associated with the second item from the plurality of items, the second item being displayed within a threshold distance from the first item, and
    wherein when the second item is disposed within the predetermined area, a panning and scrolling function is suppressed for the second input while removing the enlarged display of the first item to display the enlarged display of the second item, and when the second item is not disposed within the predetermined area, the panning and scrolling function is executed for the second input while terminating display of the auxiliary area.

2. The method of claim 1, wherein display the auxiliary area is further based on at least one of a reference area definition stored in a memory of the electronic device, resolution of a screen of the electronic device, and zoom scale at which the first item is displayed.

3. The method of claim 1, the method further comprising:
    selecting the second item from the plurality of items based on the second input, when the second input is performed within the predetermined area; and
    performing, by the electronic device, an operation other than selecting the second item, when the second input is performed, at least in part, outside of the predetermined area.

4. The method of claim 1, the method further comprising:
    selecting the second item from the plurality of items based on the second input, when the second input spans over no more than a predetermined number of other items from the plurality of items that are displayed by the electronic device; and
    performing, by the electronic device, an operation other than selecting the second item, when the second input spans over more than the predetermined number of other items from the plurality of items that are displayed by the electronic device.

5. The method of claim 1, wherein a location on the touchscreen where the auxiliary area is displayed depends on at least one of:
    a size of the first item,
    a location on the touchscreen where the first item is displayed, and
    a location on the touchscreen where the input is generated.

6. The method of claim 1, wherein the first item includes at least one of text, a still image, a movie, a website address, and a sub-menu.

7. The method of claim 1, wherein a copy of the first item is displayed in the auxiliary area.

8. An electronic device, comprising a touchscreen and a controller configured to:
    display, on the touchscreen, a plurality of items;
    select a first item from the plurality of items in response to a first input received via the touchscreen;
    determine whether a width or height of an area corresponding to the first input is less than a threshold width or height;
    display an auxiliary area on the touchscreen including an enlarged display of at least a portion of the first item, if the width or height of the area corresponding to the first input is less than the threshold width or height;
    if a second item is selected from the plurality of items in response to a second input received at the electronic device, identify whether the second item is disposed within a predetermined area of the touchscreen centered on a location of the first input;
    if the second item is disposed within the predetermined area, change the displayed auxiliary area by removing the enlarged display of the at least the portion of the first item to display an enlarged display of the second item; and
    if the second item is not disposed within the predetermined area, terminate display of the auxiliary area that is displaying the enlarged display of the at least the portion of the first item,
    wherein the auxiliary area includes information associated with a second item from the plurality of items, the second item being displayed on the touchscreen within a threshold distance from the first item, and
    wherein when the second item is disposed within the predetermined area, a panning and scrolling function is suppressed for the second input while removing the enlarged display of the first item to display the enlarged display of the second item, and when the second item is not disposed within the predetermined area, the panning and scrolling function is executed for the second input while terminating display of the auxiliary area.

9. The electronic device of claim 8, wherein display of the auxiliary area is further based on at least one of a reference area definition stored in a memory of the electronic device, resolution of a screen of the electronic device, and zoom scale at which the first item is displayed.

10. The electronic device of claim 8, the controller is further configured to:
   select the second item from the plurality of items based on the second input, when the second input is performed within the predetermined area; and
   perform an operation other than selecting the second item, when the second input is performed, at least in part, outside of the predetermined area.

11. The electronic device of claim 8, the controller is further configured to:
   select the second item from the plurality of items based on the second input, when the second input spans over no more than a predetermined number of other items from the plurality of items that are displayed by the controller; and
   perform, by the electronic device, an operation other than selecting the second item, when the second input spans over more than the predetermined number of other items from the plurality of items that are displayed by the controller.

12. The electronic device of claim 8, wherein a location on the touchscreen where the auxiliary area is displayed depends on at least one of: a size of the first item, a location on the touchscreen where the first item is displayed, and a location on the touchscreen where the input is generated.

13. The electronic device of claim 8, wherein the first item includes at least one of text, a still image, a movie, a website address, and a sub-menu.

14. The electronic device of claim 8, wherein a copy of the first item is displayed in the auxiliary area.

15. An electronic device, comprising:
a touchscreen; and
a controller configured to:
   control the touchscreen to display a plurality of items,
   detect contact by a touch object to the touchscreen for selecting a first item from among the displayed plurality of items,
   determine whether a width or height of an area corresponding to a first input is less than a threshold width or height,
   control the touchscreen to display an auxiliary area on the touchscreen including an enlarged display of at least a portion of the first item, if the width or height of the area corresponding to the first input is less than the threshold width or height,
   identifying whether a second item is disposed within a predetermined area of the touchscreen centered on a location of the first input, if detecting a drag gesture from the first item to a second item for selecting the second item,
   if the second item is disposed within the predetermined area, changing the displayed auxiliary area by removing the enlarged display of the at least the portion of the first item to display an enlarged display of the second item, and
if the second item is not disposed within the predetermined area, terminating display of the auxiliary area that is displaying the enlarged display of the at least the portion of the first item,
wherein the auxiliary area includes information associated with the second item from the plurality of items, the second item being displayed within a threshold distance from the first item, and
wherein when the second item is disposed within the predetermined area, a panning and scrolling function is suppressed for the second input while removing the enlarged display of the first item to display the enlarged display of the second item, and when the second item is not disposed within the predetermined area, the panning and scrolling function is executed for the second input while terminating display of the auxiliary area.

* * * * *